(12) United States Patent
    Goldsborough et al.

(10) Patent No.: US 11,278,012 B2
(45) Date of Patent: Mar. 22, 2022

(54) AUTOMATED AQUACULTURE MORTALITY REMOVAL SYSTEM AND METHOD

(71) Applicants: FOREVER OCEANS CORPORATION, Warrenton, VA (US); Mathew Goldsborough, Kailua Kona, HI (US); Gavin Key, Kailua-Kona, HI (US); Neil Sims, Kailua-Kona, HI (US); Joseph Denny, Kailua-Kona, HI (US); Jason Heckathorn, Nokesville, VA (US)

(72) Inventors: Mathew Goldsborough, Kailua Kona, HI (US); Gavin Key, Kailua-Kona, HI (US); Neil Sims, Kailua-Kona, HI (US); Joseph Denny, Kailua-Kona, HI (US); Jason Heckathorn, Nokesville, VA (US)

(73) Assignee: Forever Oceans Corporation, Gainesville, VA (US)

( * ) Notice: Subject to any disclaimer, the term of this patent is extended or adjusted under 35 U.S.C. 154(b) by 37 days.

(21) Appl. No.: 16/095,811

(22) PCT Filed: Apr. 25, 2017

(86) PCT No.: PCT/US2017/029323
    § 371 (c)(1),
    (2) Date: Oct. 23, 2018

(87) PCT Pub. No.: WO2017/189521
    PCT Pub. Date: Nov. 2, 2017

(65) Prior Publication Data
    US 2019/0124894 A1    May 2, 2019

Related U.S. Application Data

(60) Provisional application No. 62/327,186, filed on Apr. 25, 2016.

(51) Int. Cl.
    *A01K 63/10*    (2017.01)
    *A01K 61/60*    (2017.01)
    (Continued)

(52) U.S. Cl.
    CPC .............. *A01K 63/10* (2017.01); *A01K 61/60* (2017.01); *A01K 63/00* (2013.01); *A01K 63/006* (2013.01); *A01K 61/10* (2017.01); *Y02A 40/81* (2018.01)

(58) Field of Classification Search
    CPC .............................. A01K 63/006; A01K 63/10
    (Continued)

(56) References Cited

U.S. PATENT DOCUMENTS

| 4,113,616 A | 9/1978 | Kaes |
| 4,280,288 A * | 7/1981 | Corfa ...................... E02F 5/006 37/308 |

(Continued)

FOREIGN PATENT DOCUMENTS

| CN | 101725263 A | 6/2010 |
| JP | 2012504940 A | 3/2012 |

(Continued)

OTHER PUBLICATIONS

Nov. 26, 2019 Extended Search Report issued in European Patent Application No. 17790238.4.

(Continued)

*Primary Examiner* — David J Parsley
(74) *Attorney, Agent, or Firm* — Goodwin Procter LLP

(57) ABSTRACT

A system is provided for automatically removing deceased fish from an aquaculture cage. The system may include an underwater robotic vehicle configured to traverse the aqua- (Continued)

culture cage to collect mortalities. The mortalities, once collected, may be brought to a system dock and then removed from the cage.

19 Claims, 5 Drawing Sheets

(51) Int. Cl.
    *A01K 63/00*      (2017.01)
    *A01K 61/10*      (2017.01)

(58) Field of Classification Search
    USPC .................................................. 119/247, 264
    See application file for complete search history.

(56) References Cited

U.S. PATENT DOCUMENTS

| | | | |
|---|---|---|---|
| 5,337,434 A | 8/1994 | Erlich | |
| 5,655,245 A * | 8/1997 | Bunch | A01K 63/006 |
| | | | 119/232 |
| 5,715,773 A | 2/1998 | Martelius | |
| 5,806,463 A * | 9/1998 | Rising | A01K 63/04 |
| | | | 119/245 |
| 5,975,022 A * | 11/1999 | Miller | A01K 63/006 |
| | | | 119/264 |
| 7,051,664 B2 * | 5/2006 | Robichaud | A01D 44/00 |
| | | | 114/312 |
| 8,024,832 B1 * | 9/2011 | Niehoff | A01K 63/10 |
| | | | 119/264 |
| 2011/0185519 A1 | 8/2011 | Heard | |
| 2015/0314453 A1 | 11/2015 | Witelson et al. | |

FOREIGN PATENT DOCUMENTS

| | | |
|---|---|---|
| WO | 2013/029100 A1 | 3/2013 |
| WO | 2015005801 A1 | 1/2015 |

OTHER PUBLICATIONS

May 2, 2019 Search Report issued in Panamanian Patent Application No. 92404-01.
International Search Report and Written Opinion application No. PCT/US2017/029323 dated Oct. 30, 2018.
International Search Report and Written Opinion dated Jul. 17, 2017, issued in corresponding PCT International Application No. PCT/US2017/029323.

* cited by examiner mortality will be gathered in one section of the cage. This is not always reliable, as different cage structures and environmental conditions can cause mortalities to scatter around the cage.

AUTOMATED AQUACULTURE MORTALITY REMOVAL SYSTEM AND METHOD

CROSS-REFERENCE TO RELATED APPLICATIONS

This application claims priority from U.S. Provisional Application No. 62/327,186, filed on Apr. 25, 2016. The entire contents of this earlier filed application are hereby incorporated by reference in their entirety.

BACKGROUND

Field

Embodiments of the invention relate to robotics, and more specifically, certain embodiments relate to the use of robotic systems in the removal of deceased fish from an aquaculture cage.

Description of the Related Art

Removing deceased fish, referred to as mortalities, from an aquaculture cage is of paramount importance. In any aquaculture growing cycle, it is impossible to completely prevent mortalities from occurring. When mortalities do occur, it is important to remove them from the rest of the cohort in a timely manner. When mortalities are left in the cage, they can start to decay, playing host to parasites and disease. Failure to remove mortalities can lead to contamination of the cohort and one dead fish becomes many dead fish, reducing the profitability of the farm.

Traditional methods for removing mortalities from an aquaculture cage fall into two categories: manual and mechanically assisted. Manual removal of mortalities requires divers to enter the aquaculture cage and physically remove mortalities from the cage floor or walls by hand. This is not only expensive and time consuming, but dangerous. Entering a stocked aquaculture cage is a strenuous task, requiring divers to spend copious amounts of time tens of meters below the surface performing physically demanding work while in the presence of a densely packed school of fish.

Mechanically assisted mortality removal methods usually involve a pump being lowered into a cage at a strategic location and pumping the mortalities to the surface. This process incurs its own difficulties. If the cage in question is submerged, the cage must be raised for mortality removal. The mechanically assisted method requires equipment and personnel to be onsite to operate. This means that in the event of inclement weather, mortality removal may not happen on schedule in an effort to assure the safety of said equipment and personnel. This interruption in cleaning cycles can lead to mortalities being left too long in the cage which can lead to the aforementioned negative effects. This mechanically assisted method, even when on schedule, does not always clean the cage effectively. This method requires manipulation of equipment on the bottom of the cage from the surface, which can lead to inexact placement of the suction pump. This also relies on the expectation that mortalities will be gathered in one section of the cage. This is not always reliable, as different cage structures and environmental conditions can cause mortalities to scatter around the cage.

There is, therefore, a pressing need to automate mortality removal in a timely and dexterous manner.

SUMMARY

One embodiment is directed to an apparatus that may include at least one locomotion unit configured to cause the apparatus to move along a floor or wall of an aquaculture cage. The apparatus may also include a collection unit configured to collect mortalities from the aquaculture cage, and a transport chamber configured to transport the collected mortalities from the collection unit to a holding chamber. The holding chamber may be configured to hold the collected mortalities.

Another embodiment is directed to a system that may include a robotic vehicle. The robotic vehicle may include at least one locomotion unit configured to cause the apparatus to move along a floor or wall of an aquaculture cage, a collection unit configured to collect mortalities from the aquaculture cage, and a transport chamber configured to transport the collected mortalities from the collection unit to a holding chamber configured to hold the collected mortalities. The system may also include a dock that includes a locking mechanism configured to secure the robotic vehicle during a docking event, a power connection point configured to transfer power through wired or wireless means, and an external storage chamber configured to store the mortalities deposited by the robotic vehicle.

Another embodiment is directed to a method that may include traversing, by a robotic vehicle, a floor or wall of an aquaculture cage in a search path, and collecting, by the robotic vehicle moving along a floor or wall of an aquaculture cage, mortalities from the aquaculture cage. The method may also include transporting, via a transport chamber of the robotic vehicle, the collected mortalities to a holding chamber of the robotic vehicle, and upon completing a cleaning cycle, depositing the collected mortalities at a dock.

Another embodiment is directed to an apparatus that may include locomotion means for moving the apparatus along a floor or wall of an aquaculture cage, collecting means for collecting mortalities from the aquaculture cage, and transporting means for transporting the collected mortalities from the collection means to a holding means for holding the collected mortalities.

BRIEF DESCRIPTION OF THE DRAWINGS

For proper understanding of the invention, reference should be made to the accompanying drawings, wherein.

DETAILED DESCRIPTION

The invention will be readily described and illustrated in the figures herein, and may be arranged and designed in a wide variety of different configurations. Thus, the following detailed description of the embodiments of an automated mortality removal system and method, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different configurations and functions discussed below may be performed in a different order and/or concurrently with each other. Furthermore, if desired, one or more of the described configurations or functions may be optional or may be combined. As such, the following description should be considered as merely illustrative of the principles, and embodiments of this invention, and not in limitation thereof.

One embodiment is directed to a system that includes an autonomous robotic vehicle that may navigate inside an aquaculture cage collecting dead fish (mortalities), removing them from the cage environment, and depositing them in a specified location. In an embodiment, the robotic vehicle may navigate the cage by physically gripping onto the cage mesh. The robotic vehicle, or rover, may be equipped with internal and/or external sensors to aid in navigation as well as actuation to help with mortality acquisition and locomotion. The system may also include a base or home unit, the dock, that may be the used for power and fish depositing purposes. The robotic vehicle may start and end a cleaning cycle at the dock.

Figure 1:
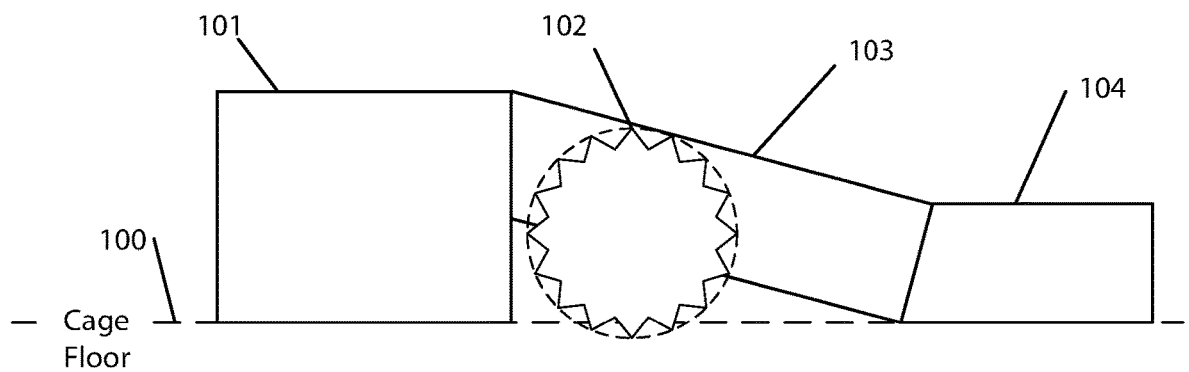
FIG. 1 illustrates the profile view of a mortality removing robotic vehicle, according to one embodiment.

FIG. 1 illustrates a profile view of one embodiment of an autonomous morality collecting rover, which may also be referred to herein as the vehicle or robotic vehicle. In an embodiment, the vehicle may crawl along the cage netting 100 using locomotion units 102. This embodiment uses toothed wheels 102 to navigate the cage floor 100, though other embodiments may use treads or other friction based locomotion methods. Yet other embodiments may use thrusters in addition to friction based locomotion units to allow the vehicle access to all planes of cage netting. Thus, embodiments of the invention are not limited to the cage floor 100 but may navigate all cage netting surfaces. For conciseness, cage floor 100 will be used to refer to any mesh surface that the vehicle may access.

The vehicle body may be comprised of three separate sections: the holding chamber 101, the collection unit 104, and the transport chamber 103. In this embodiment, the holding chamber 101 is located at the rear of the vehicle. The holding chamber 101 may be sized to accommodate any number of mortalities that may be anticipated during a cleaning cycle. The collection unit 104 is located in the front of the vehicle, in this embodiment. In other embodiments, the collection unit 104 may be located on one side, or both sides, or wherever is deemed appropriate to fulfill its function(s). A function of the collection unit 104 is to collect the mortalities. The mortalities will enter the vehicle through the collection unit 104. The transport unit 103 may serve the purpose of transporting mortalities from the collection unit 104 to the holding chamber 101.

Figure 2:
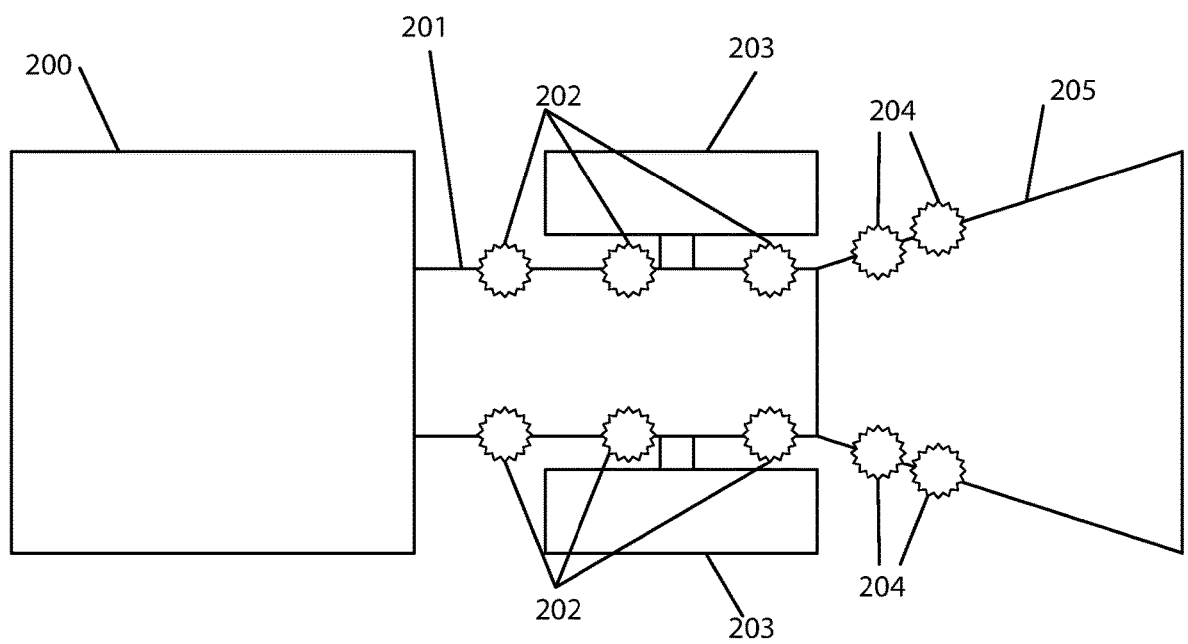
FIG. 2 illustrates a plan view of a mortality removing robotic vehicle, according to one embodiment.

FIG. 2 illustrates a plan view of one embodiment of the mortality removing vehicle. In addition to the previously described holding chamber 200, transport chamber 201, locomotion units 203, and collection unit 205, this illustrates an embodiment of the collection conveyors 204 and transport conveyors 202. The collection conveyors 204 are actuators to help orient mortalities inside the collection unit 205. This embodiment shows the collection conveyors 204 as vertical bristled rollers, such as one might find in a traditional vacuum cleaner. The bristles may be made of soft synthetics such as nylon or more rigid metals such as brass. In another embodiment, the collection conveyors 204 may be conveyor belts. The collection conveyors 204 may also be placed horizontally to assist in mortality positioning. The transport conveyors 202 may be in the same design as the collection conveyors 204 and serve the purpose of assisting mortalities through the transport chamber 201 to the holding chamber 200. In the illustrated embodiment, the transport conveyors 202 are the aforementioned bristled rollers placed vertically on either side of the transport chamber. In another embodiment, the transport conveyors 202 may be conveyor belts placed horizontally on the top and/or bottom of the transport chamber 201 to complete their function. In another embodiment, the collection conveyors 204 and/or the transport conveyors 202 may be vacuum based, using pumps to achieve the conveyor function. In yet another embodiment, the conveyor function may be accomplished using a combination of vacuum and contact conveyors.

Figure 3:
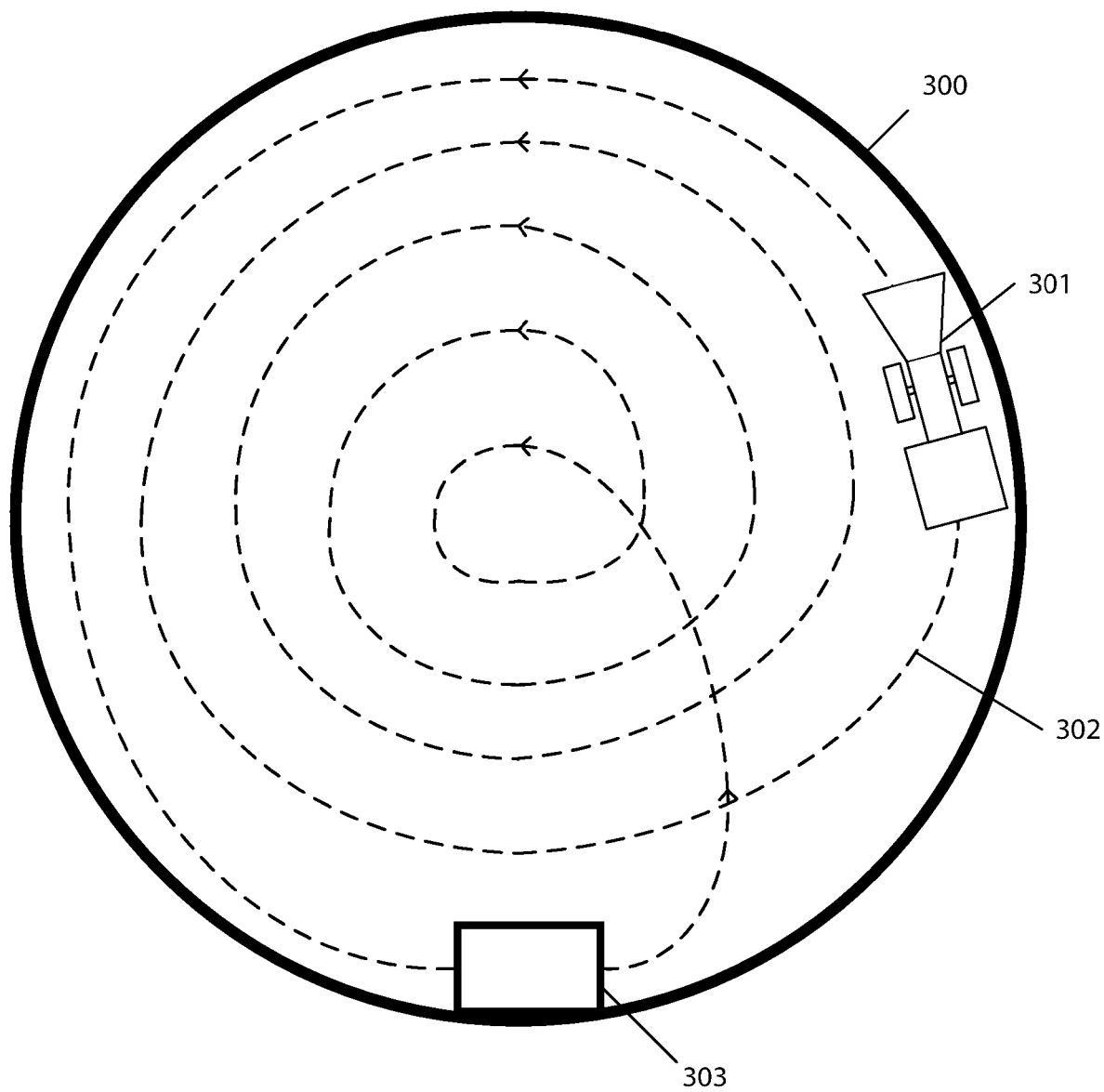
FIG. 3 illustrates a plan view of a mortality removal system in situ with path, according to one embodiment.

FIG. 3 illustrates a plan view of an embodiment of the mortality removal system in a cage environment. In this embodiment, the collection vehicle 301 will start at a dock 303. From the dock 303 the vehicle 301 will traverse the cage floor in a search path 302. The search path 302 may be deterministic or random. The vehicle 301 may use external or internal sensors, such as a beacon from the dock 303, wheel encoders, or bump sensors for sensing the cage wall 300 to assist in adherence to the search path 302. As the vehicle 301 encounters mortalities along the search path 302 it may collect them and deposit them at the dock 303 upon completion of the cleaning cycle. The illustrated embodiment of the search path 302 uses tangentially connected, concentric spiral splines to reach all points of the environment and return to the dock 303. The search path 302 may be continually improved and augmented to achieve the desired mortality collection. In another embodiment, the vehicle 301 may have a remote operation mode in which the search path 302 may be directly modified or overridden in order to achieve mortality collection. This remote operation may be achieved by a wired or wireless data link to the vehicle 301 from the dock 303 or other point in the cage.

Figure 4:
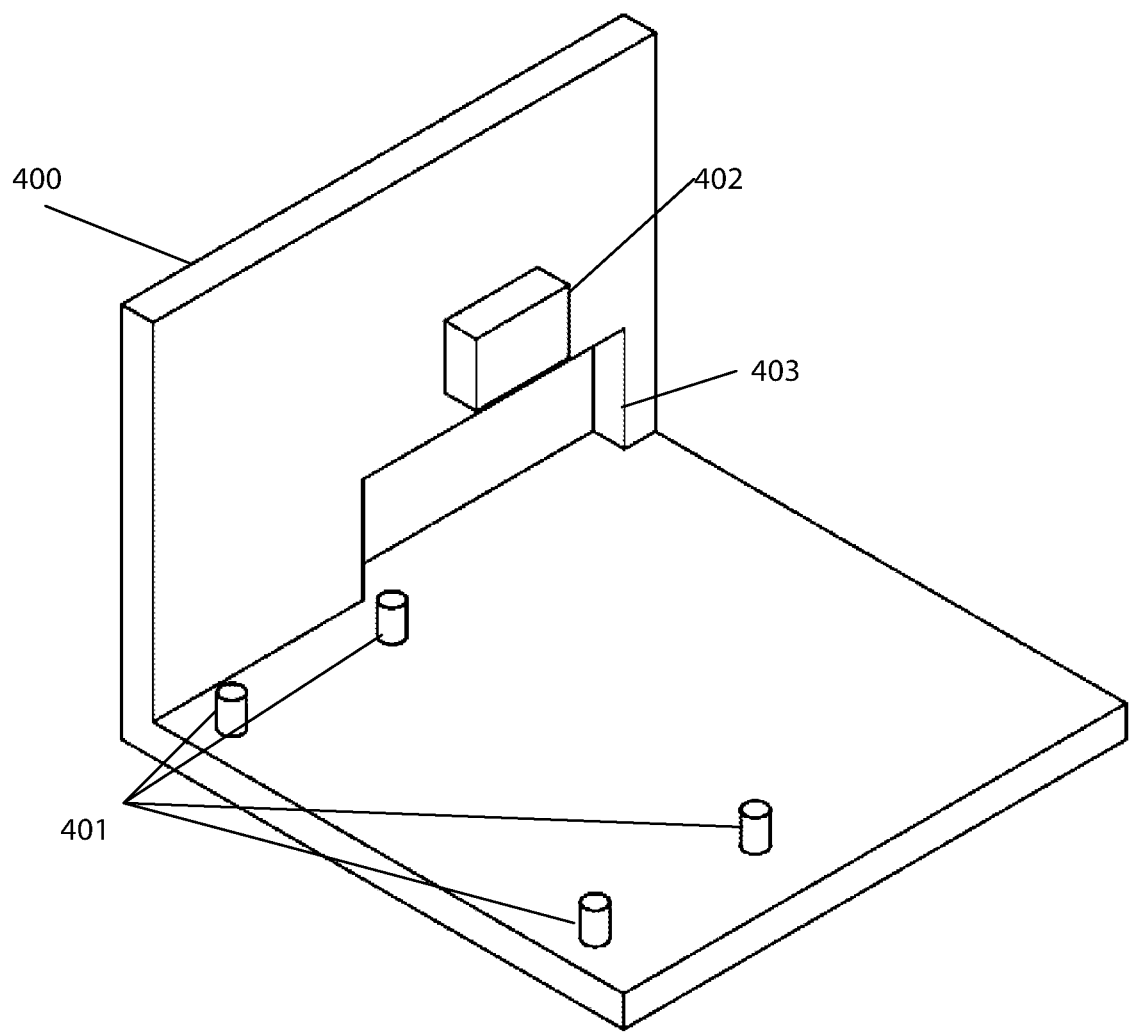
FIG. 4 illustrates an isometric view of a docking station, according to one embodiment.

FIG. 4 illustrates an isometric view of a dock embodiment. The dock 400 may be constructed out of High Density Polyethylene (HDPE) or other appropriate material. The illustrated embodiment of the dock 400 includes a vertical and horizontal structure, though other embodiments may only use a vertical structure or horizontal structure, in which case all subsequent components would be relegated to whichever structures are present. The dock 400 may utilize a locking mechanism 401 to secure the aforementioned vehicle during a docking event. In one embodiment, these locks 401 may be mechanically actuated dead bolts, while in another they may be magnetic coupling points. The dock may be equipped with a power connection point 402. In one embodiment, the vehicle is battery powered. In this embodiment, the power connection point 402 may house a wireless charging station for inductive power transfer or magnetodynamic coupling. The power connection point 402 may also be a physical connection point for wired power transfer. In another embodiment, the aforementioned vehicle is tethered to the dock 400 and this power connection point 402 may house retractable power cables. The dock 400 may also include a gate 403. This gate 403 aligns with a complementary opening on the vehicle holding chamber. When docked, the gate 403 may facilitate the transport of mortalities from the vehicle out of the cage.

Figure 5:
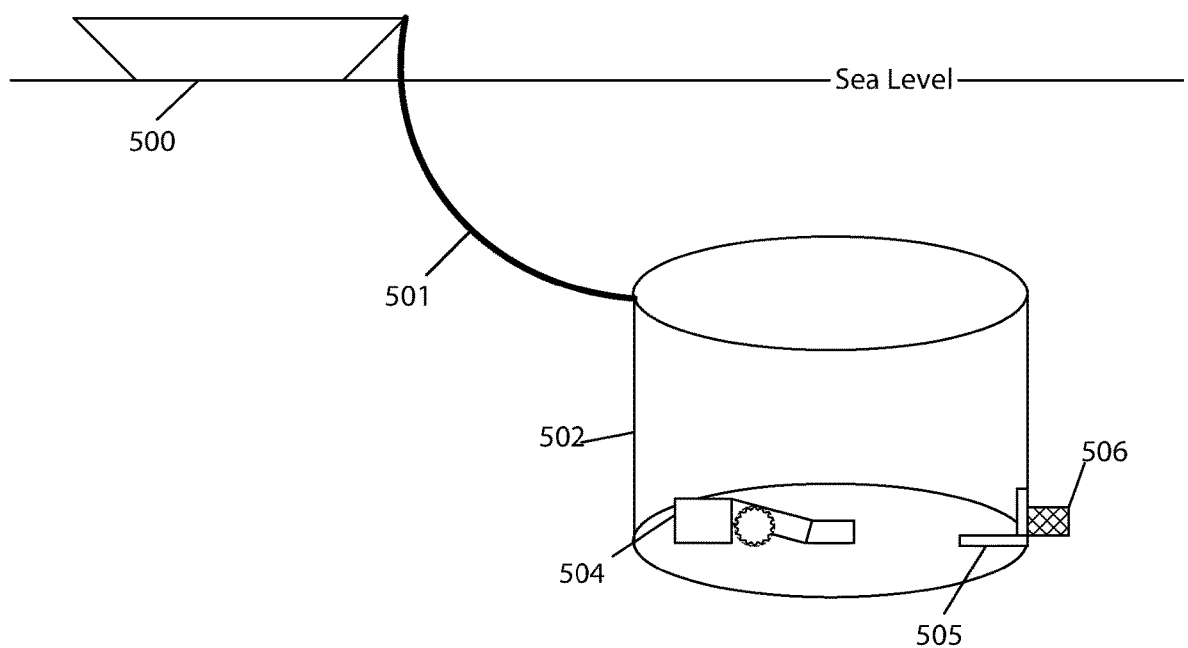
FIG. 5 illustrates a profile view of an extended mortality removal system in a submerged aquaculture cage, according to one embodiment.

FIG. 5 illustrates one embodiment of the mortality removal system inside a submerged cage environment. In such an embodiment, the system may be implemented in a cage 502 attached to a moored barge 500. Power and communications for the system may come from the barge 500 via a tether 501 to the cage 502. Power and communications may then be transferred to the system via the system dock 505. The system dock 505 may be placed at a strategic point in the cage 502. In the illustrated embodiment, that strategic point is the back of the cage 502. Attached to the dock 505 may be found an external storage chamber 506. Once the vehicle 504 has completed a cleaning cycle, it may return to the dock 505. At the dock 505 the vehicle 504 may deposit mortalities into the external storage chamber 506 via the aforementioned gate. The external storage chamber 506 may be used to store mortalities outside the cage, separate from the living population, until such a time as the mortalities can be collected. In one embodiment, a diver may manually service the external storage chamber 506. In another embodiment, an unmanned robotic vehicle may collect mortalities from the external storage chamber 506. In yet another embodiment, the external storage chamber 506 is a robotic system itself and delivers the mortalities to the surface upon collection from the vehicle 504.

In another embodiment, the automated mortality removal system may be installed on a surface pen. In this embodiment, an external storage chamber 506 could be directly connected to a barge 500 for immediate removal of mortalities from the water.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   at least one locomotion unit configured to cause the apparatus to move along a floor or wall of an aquaculture cage;
   a collection unit comprising opposite sides and configured to collect mortalities from the aquaculture cage,
      wherein the collection unit comprises collection conveyors to orient the mortalities inside the collection unit; and
   a transport chamber comprising opposite sides and configured to transport the collected mortalities from the collection unit to a holding chamber,
      wherein the holding chamber is configured to hold the collected mortalities,
      wherein the transport chamber comprises transport conveyors,
      wherein the collection conveyors and the transport conveyors comprise bristled rollers, and
      wherein the bristled rollers are positioned on the opposite sides of the collection unit and on the opposite sides of the transport chamber.

2. The apparatus according to claim 1, wherein the apparatus is configured to traverse the floor or wall of the aquaculture cage in a search path to collect the mortalities.

3. The apparatus according to claim 2, wherein the search path is random or deterministic.

4. The apparatus according to claim 2, wherein the apparatus further comprises sensors configured to sense a wall of the aquaculture cage in order to adhere to the search path.

5. The apparatus according to claim 2, wherein the apparatus is configured to begin the search path from a dock, and wherein the apparatus is configured to deposit the collected mortalities at the dock upon completion of the search path.

6. The apparatus according to claim 1, wherein the at least one locomotion unit comprises toothed wheels configured to navigate the apparatus along the floor or the wall of the aquaculture cage.

7. The apparatus according to claim 1, wherein the at least one locomotion unit comprises thrusters that allow the apparatus to access all planes of the aquaculture cage.

8. The apparatus according to claim 1, wherein the collection conveyors further comprise at least one of conveyor belts or vacuums.

9. The apparatus according to claim 1, wherein the transport conveyors are configured to move the collected mortalities through the transport chamber to the holding chamber.

10. The apparatus according to claim 1, wherein the transport conveyors further comprise at least one of conveyor belts or vacuums.

11. The apparatus according to claim 1, wherein the bristled rollers comprise vertical bristled rollers.

12. The apparatus according to claim 11, wherein at least a portion of the collection conveyors and the transport conveyors are placed horizontally.

13. The apparatus according to claim 1, wherein the bristled rollers comprise synthetic bristles or metal bristles.

14. A system, comprising:
   a robotic vehicle comprising:
      at least one locomotion unit configured to cause the robotic vehicle to move along a floor or wall of an aquaculture cage;
      a collection unit comprising opposite sides and configured to collect mortalities from the aquaculture cage,
         wherein the collection unit comprises collection conveyors to orient the mortalities inside the collection unit; and
      a transport chamber comprising opposite sides and configured to transport the collected mortalities from the collection unit to a holding chamber,
         wherein the holding chamber is configured to hold the collected mortalities,
         wherein the transport chamber comprises transport conveyors,
         wherein the collection conveyors and the transport conveyors comprise bristled rollers,
         wherein the bristled rollers are positioned on the opposite sides of the collection unit and on the opposite sides of the transport chamber; and a dock comprising:
- a locking mechanism configured to secure the robotic vehicle during a docking event;
- a power connection point configured to transfer power through wired or wireless means; and
- an external storage chamber configured to store the mortalities deposited by the robotic vehicle.

15. The system according to claim 14, wherein the bristled rollers comprise vertical bristled rollers.

16. The system according to claim 15, wherein at least a portion of the collection conveyors and the transport conveyors are placed horizontally.

17. A method, comprising:
- traversing, by a robotic vehicle, a floor or wall of an aquaculture cage in a search path;
- collecting, by the robotic vehicle moving along a floor or wall of an aquaculture cage, mortalities from the aquaculture cage,
  - wherein the robotic vehicle comprises a collection unit comprising opposite sides and configured to collect the mortalities from the aquaculture cage, and
  - wherein the collection unit comprises collection conveyors to orient the mortalities inside the collection unit;
- transporting, via a transport chamber of the robotic vehicle, the collected mortalities to a holding chamber of the robotic vehicle,
  - wherein the transport chamber comprises transport conveyors and opposite sides,
  - wherein the collection conveyors and the transport conveyors comprise bristled rollers, and
  - wherein the bristled rollers are positioned on the opposite sides of the collection unit and on the opposite sides of the transport chamber; and
- upon completing a cleaning cycle, depositing the collected mortalities at a dock.

18. The method according to claim 17, wherein the bristled rollers comprise vertical bristled rollers.

19. The method according to claim 18, wherein at least a portion of the collection conveyors and the transport conveyors are placed horizontally.

* * * * *